US008731997B2

(12) United States Patent
Corbett et al.

(10) Patent No.: US 8,731,997 B2
(45) Date of Patent: May 20, 2014

(54) CAPACITY PLANNING FOR USER WAIT TIME

(75) Inventors: Allison Mensing Corbett, Arlington, MA (US); Sudhakar Mallya, Richardson, TX (US); Ashley Bree Ross, Weatherford, OK (US); Kris Deion Tullos, Charlotte, NC (US); Chang Yu, Allen, TX (US)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 13/559,899

(22) Filed: Jul. 27, 2012

(65) Prior Publication Data

US 2012/0296820 A1  Nov. 22, 2012

Related U.S. Application Data

(63) Continuation of application No. 13/038,321, filed on Mar. 1, 2011.

(51) Int. Cl.
  *G06Q 10/06*   (2012.01)
  *G06Q 10/10*   (2012.01)
  *G06Q 40/00*   (2012.01)
(52) U.S. Cl.
  USPC ............. 705/7.36; 705/43; 705/305; 235/379

(58) Field of Classification Search
  CPC ............. G06Q 10/06; G06Q 10/0875; G06Q 10/0637; G06Q 10/0639; G06Q 30/0631; G06Q 40/04
  USPC ............ 235/379; 705/1, 7, 26, 43, 7.36, 26.7, 705/29, 305, 14.19, 37, 7.38
  See application file for complete search history.

(56) References Cited

U.S. PATENT DOCUMENTS

| | | | |
|---|---|---|---|
| 7,392,206 B1 * | 6/2008 | Frazier et al. | 705/26.7 |
| 2002/0082994 A1 * | 6/2002 | Herziger | 705/43 |
| 2003/0141360 A1 * | 7/2003 | De Leo et al. | 235/379 |
| 2004/0050927 A1 * | 3/2004 | Nozaki et al. | 235/379 |
| 2005/0131729 A1 * | 6/2005 | Melby et al. | 705/1 |
| 2010/0324955 A1 * | 12/2010 | Rinehart et al. | 705/7 |

* cited by examiner

*Primary Examiner* — Matthew Gart
*Assistant Examiner* — Reva R Danzig
(74) *Attorney, Agent, or Firm* — Banner & Witcoff, Ltd.; Michael A. Springs (57) ABSTRACT

Systems and methods are disclosed for determining when installation of additional self-service financial transaction devices (SSFTDs) may be desired at a site to improve end-to-end user experience. The system may collect and store transaction-level data, session-level data, user wait time data, and/or other data, and use an enhanced SSFTD user wait time model to identify recommendations and other statistical outputs. The SSFTD may include hardware and software to assist in measuring and collecting various useful readings.

20 Claims, 9 Drawing Sheets

| Time of Customer Arrival | Session Time + Dwell Time | Wait time (Single Walk-up) | Wait time (Double Walk-up) |
|---|---|---|---|
| 9:00 | 5 min | 0 | 0 |
| 9:01 | 1 min | 4 min | 0 min |
| 9:02 | 2 min | 4 min | 0 min |
| 9:03 | 2 min | 5 min | 1 min |
| 9:05 | 1 min | 5 min | 0 min |

CAPACITY PLANNING FOR USER WAIT TIME

RELATED APPLICATION DATA

This application is a continuation of co-pending U.S. patent application Ser. No. 13/038,321 filed on Mar. 1, 2011. All of the aforementioned are entirely incorporated herein by reference.

TECHNICAL FIELD

Aspects of the present disclosure relate to a self-service financial transaction device (SSFTD). More specifically, aspects of the disclosure relate to modeling and/or modifying a SSFTD to improve end to end user experience.

BACKGROUND

Customers of financial institution entities regularly fulfill their business and personal banking needs by conducting transactions through various types of automated and computerized systems. Not only do these systems continue to provide fast and efficient alternatives to waiting for assistance from a customer representative of the entity (e.g., a bank teller) when the transaction at hand is relatively simple and straightforward, such as a cash withdrawal, but such systems have also advanced to where many transactions that can be completed in-person with the assistance of a customer representative can also be completed without the assistance of a customer representative. For example, automated teller machines (ATMs) are able to provide customers (e.g., users, customers, clients, or individuals) with the ability to withdraw and/or deposit money, request cash advances on one or more credit cards, review and/or print account balances and activity reports, as well as numerous other transaction types.

With the proliferation of ATMs, financial institutions have been using aggregated utilization statistics (e.g., what percentage of the time the ATM is in use) to determine when additional ATMs are desired at a location. The ATM utilization model is based on models financial institutions have used for capacity planning for full-service bank teller planning. In both instances, while utilization is an indicator of user need for more ATMs/tellers at a location, analysis narrowly focused on utilization fails to address other aspects to be desired.

BRIEF SUMMARY

In light of the foregoing background, the following presents a simplified summary of the present disclosure in order to provide a basic understanding of some aspects of the disclosure. This summary is not an extensive overview of the disclosure. It is not intended to identify key or critical elements of the disclosure or to delineate the scope of the disclosure. The following summary merely presents some concepts of the disclosure in a simplified form as a prelude to the more detailed description provided below.

Aspects of the present disclosure are directed to a method and system for determining when installation of additional self-service financial transaction devices (SSFTDs) may be desired at a site to improve end-to-end user experience. The system may collect and store transaction-level data, session-level data, user wait time data, and/or other data, and use an enhanced SSFTD user wait time model to identify recommendations and other statistical outputs. The SSFTD may include hardware and software to assist in measuring and collecting various useful readings.

This summary is provided to introduce a selection of concepts in a simplified form that are further described below in the Detailed Description. The summary is not intended to identify key features or essential features of the claimed subject matter, nor is it intended to be used to limit the scope of the claimed subject matter.

BRIEF DESCRIPTION OF THE DRAWINGS

A more complete understanding of aspects of the present disclosure and the advantages thereof may be acquired by referring to the following description in consideration of the accompanying drawings, in which like reference numbers indicate like features, and wherein.

DETAILED DESCRIPTION

In the following description of various illustrative embodiments, reference is made to the accompanying drawings, which form a part hereof, and in which is shown by way of illustration various embodiments in which one or more aspects of the disclosure may be practiced. It is to be understood that other embodiments may be utilized and structural and functional modifications may be made without departing from the scope of the present disclosure.

By way of general introduction, aspects of the disclosure relate to providing methods and systems for determining when installation of additional self-service financial transaction devices (SSFTDs), such as automated teller machines (ATMs), may be desired at a location/site, and generating, by a computer, recommendations/statistics accordingly. The system may include a computer system with one or more memories (e.g., database, data store, or other means for memory) to store transaction-level data and other data (e.g., session-level data, or user wait time data) about SSFTDs and an enhanced SSFTD user wait time model (hereinafter referred to as "enhanced model") to identify appropriate recommendations and other outputs.

In another aspect of the disclosure, a system may include hardware (e.g., sensors, timers, audio/video recorders, or similar type hardware) and/or software components (e.g., computer-executable instructions stored on non-transitory, tangible computer-readable media) to assist in measuring and collecting various readings relating to various aspects/factors including, but not limited to, SSFTD utilization, user wait time and usage time, and other factors. The various measurements may be used, in some embodiments, to improve the end-to-end user experience, including optimizing the total time that a user may wait to use a SSFTD. In addition, the measurements collected may be stored in a memory (e.g., database or data store) for further analytics, modeling, and testing.

Figure 1:
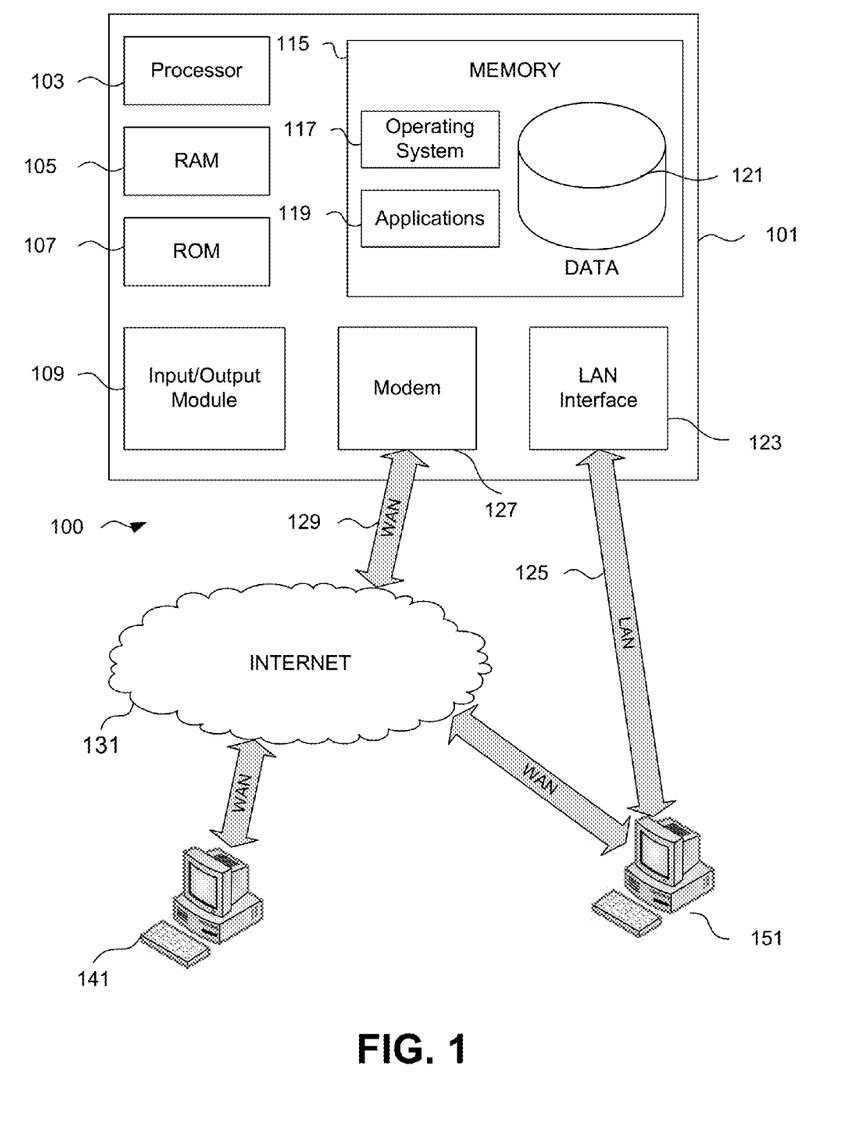
FIG. 1 illustrates a schematic diagram of a general-purpose digital computing environment in which certain aspects described herein may be implemented.

FIG. 1 illustrates a block diagram of a generic computing device 101 (e.g., a computer server) that may be used according to an illustrative embodiment of the disclosure. The computer server 101 may have a processor 103 for controlling overall operation of the server and its associated components, including RAM 105, ROM 107, input/output module 109, and memory 115.

Input/Output (I/O) 109 may include a microphone, keypad, touch screen, camera, and/or stylus through which a user of device 101 may provide input, and may also include one or more of a speaker for providing audio output and a video display device for providing textual, audiovisual and/or graphical output. Other I/O devices through which a user and/or other device may provide input to device 101 also may be included. Software may be stored within memory 115 and/or storage to provide instructions to processor 103 for enabling server 101 to perform various functions. For example, memory 115 may store software used by the server 101, such as an operating system 117, application programs 119, and an associated database 121. Alternatively, some or all of server 101 computer executable instructions may be embodied in hardware or firmware (not shown). As described in detail below, the database 121 may provide centralized storage of characteristics associated with individuals, allowing interoperability between different elements of the business residing at different physical locations.

Server 101 may operate in a networked environment 100 supporting connections to one or more remote computers, such as terminals 141 and 151. The terminals 141 and 151 may be personal computers or servers that include many or all of the elements described above relative to the server 101. The network connections depicted in FIG. 1 include a local area network (LAN) 125 and a wide area network (WAN) 129, but may also include other networks. When used in a LAN networking environment, the computer 101 is connected to the LAN 125 through a network interface or adapter 123. When used in a WAN networking environment, the server 101 may include a modem 127 or other means for establishing communications over the WAN 129, such as the Internet 131. It will be appreciated that the network connections shown are illustrative and other means of establishing a communications link between the computers may be used. Furthermore, any of a number of different communication protocols, such as TCP/IP, Ethernet, FTP, HTTP and the like, may be used within networked environment 100.

Additionally, an application program 119 used by the server 101 according to an illustrative embodiment of the disclosure may include computer executable instructions for invoking functionality related to providing access authorization for facilities and networks.

Computing device 101 and/or terminals 141 or 151 may also be mobile terminals including various other components, such as a battery, speaker, and antennas (not shown).

The disclosure is operational with numerous other general purpose or special purpose computing system environments or configurations. Examples of well known computing systems, environments, and/or configurations that may be suitable for use with the disclosure include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The disclosure may be described in the general context of computer-executable instructions, such as program modules, being executed by a computer. Generally, program modules include routines, programs, objects, components, or data structures, that perform particular tasks or implement particular abstract data types. The disclosure may also be practiced in distributed computing environments where tasks are performed by remote processing devices that are linked through a communications network. In a distributed computing environment, program modules may be located in both local and remote computer storage media including memory storage devices.

Figure 2:
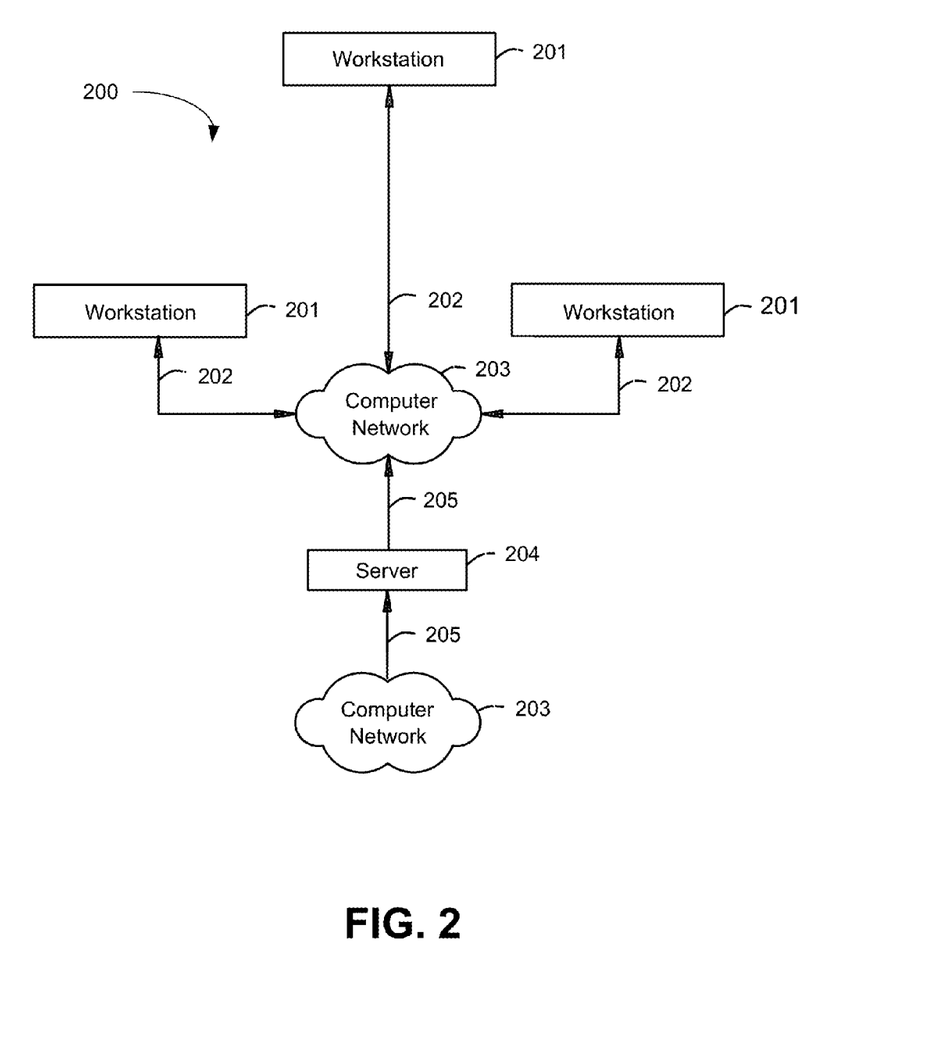
FIG. 2 is an illustrative block diagram of workstations and servers that may be used to implement the processes and functions of certain embodiments of the present disclosure.

Referring to FIG. 2, an illustrative system 200 for implementing methods according to the present disclosure is shown. As illustrated, system 200 may include one or more workstations 201. Workstations 201 may be local or remote, and are connected by one or more communications links 202 to computer network 203 that is linked via communications links 205 to server 204. In system 200, server 204 may be any suitable server, processor, computer, or data processing device, or combination of the same.

Computer network 203 may be any suitable computer network including the Internet, an intranet, a wide-area network (WAN), a local-area network (LAN), a wireless network, a digital subscriber line (DSL) network, a frame relay network, an asynchronous transfer mode (ATM) network, a virtual private network (VPN), or any combination of any of the same. Communications links 202 and 205 may be any communications links suitable for communicating between workstations 201 and server 204, such as network links, dial-up links, wireless links, or hard-wired links.

The steps that follow in the Figures may be implemented by one or more of the components in FIGS. 1 and 2 and/or other components, including other computing devices.

Figure 3:
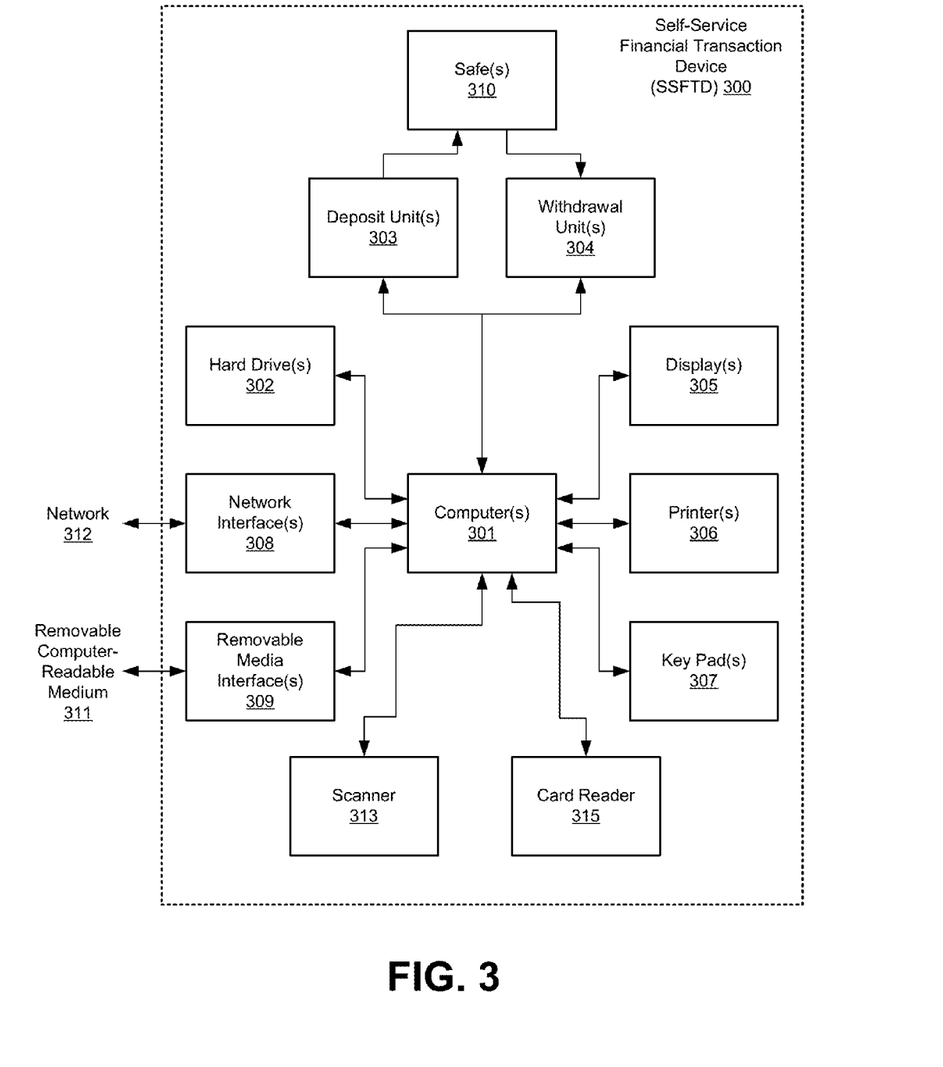
FIG. 3 is an illustrative functional block diagram of a self-service financial transaction device (SSFTD) according to one or more aspects described herein.

FIG. 3 is an illustrative functional block diagram of a self-service financial transaction device (SSFTD) 300. SSFTD 300 may include, for example, an automated teller machine (ATM) or automated kiosk for depositing (e.g., receiving a check for deposit in a user's account) and/or withdrawing (e.g., dispensing currency from a user's account) monetary funds, such as checks and cash, checking account balances (e.g., providing a total balance of a user's account), receiving cash advances, and performing various other financial transactions. While withdrawals from SSFTD 300 by a user are typically provided to the user as currency, deposits made in SSFTD 300 may be in the form of currency, checks, and other such forms.

As shown in FIG. 3, SSFTD 300 may include a computer 301, a hard drive 302 or other computer-readable medium, a deposit unit 303, a withdrawal unit 304, a display 305, a printer 306, a keypad 307, a network interface 308, a removable media interface 309, a safe 310, a scanner 313, and a card reader 315. Although computer 301 is labeled as a "computer," any one or more of the other functional blocks in FIG. 3 may also be or include a computer. As understood, SSFTD 300 may include one or more computers 301, hard drives 302, deposit units 303, withdrawal units 304, displays 305, printers 306, key pads 307, network interfaces 308, removable media interfaces 309, safes 310, scanners 313, and card readers 315.

The term "computer" as referred to herein broadly refers to any electronic, electro-optical, and/or mechanical device, or system of multiple physically separate or physically joined such devices, that is able to process and manipulate information, such as in the form of data. Non-limiting examples of a computer include one or more personal computers (e.g., desktop or laptop), servers, smart phones, personal digital assistants (PDAs), television set top boxes, and/or a system of these in any combination or sub-combination. In addition, a given computer may be physically located completely in one location or may be distributed amongst a plurality of locations (i.e., may implement distributive computing). A computer may be or include a general-purpose computer and/or a dedicated computer configured to perform only certain limited functions.

A computer typically includes hardware that may execute software and/or be configured in hardware to perform specific functions. The software may be stored on a computer-readable medium in the form of computer-readable instructions. A computer may read those computer-readable instructions, and in response perform various steps as defined by those computer-readable instructions. Thus, any functions attributed to any of the functional blocks of FIG. 3 as described herein may be implemented, for example, by reading and executing such computer-readable instructions for performing those functions, and/or by any hardware subsystem (e.g., a processor) from which the computer is composed. Moreover, steps or methods described herein may be implemented through computer-executable instructions stored on the aforementioned memory (and memory 115 in a remote computing system.)

The term "computer-readable medium" as used herein includes not only a single physical medium or single type of medium, but also a combination of one or more physical media and/or types of media. Examples of a computer-readable medium include, but are not limited to, one or more memory chips, hard drives (e.g., hard drive 302), optical discs (such as CDs or DVDs), magnetic discs, and magnetic tape drives. A computer-readable medium may be considered part of a larger device or it may be itself removable from the device. For example, a commonly-used removable computer-readable medium is a universal serial bus (USB) memory stick that interfaces with a USB port of a device.

A computer-readable medium may store computer-readable instructions (e.g., software) and/or computer-readable data (i.e., information that may or may not be executable). In the present example, a computer-readable medium (such as memory) may be included in any one or more of the functional blocks shown in FIG. 3 and may store computer-executable instructions and/or data used by any of those functional blocks. Alternatively or additionally, such a computer-readable medium storing the data and/or software may be physically separate from, yet accessible by, any of the functional blocks shown in FIG. 3.

In an arrangement where SSFTD 300 may be an automated teller machine (ATM), computer 301 may be embodied as a personal computer and may be responsible for the overall control of SSFTD 300. To perform such control, computer 301 may execute, for example, one or more software applications, one or more device control programs, and one or more operating systems, each of which may be stored on hard drive 302, which may be a single physical hard drive or multiple physical hard drives. These various elements will be discussed in further detail below.

Hard drive 302 may be a single physical hard drive unit or may include multiple physical hard drive units. Rather than, or in addition to, hard drive 302, SSFTD 300 may store data and/or computer-executable instructions on one or more other types of computer-readable medium, such as an optical disc drive, a magnetic tape drive, and/or memory chips.

Deposit unit 303 may be responsible for physically receiving deposited items such as currency and checks, for physically counting the deposited items, for physically holding the deposited items in an escrow area during a deposit transaction, for calculating the value of the deposited items, and for physically transferring the deposited items to safe 310 when the transaction is complete.

Withdrawal unit 304 may be responsible for physically retrieving currency or other items from safe 310 during a withdrawal transaction, and for physically providing the retrieved currency to the user.

Display 305 may be responsible for displaying a visual user interface to the user, and may also incorporate a touch screen capability for receiving user input. Typical information that may be presented on display 305 includes text and/or graphics representing the status of a transaction. Likewise, printer 306 may be responsible for presenting a paper printout containing information about a transaction.

Key pad 307 may include one or more buttons, switches, and/or other physical user input elements, and may be responsible for receiving user input associated with a transaction. For example, key pad 307 may include digit keys zero through nine and other function keys. Card reader 315 may be any type of device that reads data from a card, such as the magnetic strip on magnetic cards such as ATM/bank cards.

Network interface 308 (e.g., communications network transmitter) may be responsible for data communication between SSFTD 300 and a remote computing system 101 over a network 312. The communication may be uni-directional or bi-directional. Network 312 may be a single network or combination of multiple coupled networks, and may be wireless and/or wired. Examples of network 312, or portions thereof, include the Internet, a wired or wireless local area network, a satellite communication network, and various other data or communication networks. The data communicated from the SSFTD 300 to a remote computer 101 may include, but is not limited to, transaction data, session data, and/or user wait time data.

Removable media interface 309 may be responsible for reading from and/or writing to a removable computer-readable medium 311, such as a USB key, a compact disc (CD), a floppy magnetic disc, or a portable hard drive. Removable media interface 309 may therefore include a physical port for plugging in or otherwise temporarily receiving removable computer-readable medium 311. This port may be physically part of, for instance, the housing of computer 301. However, the port may be located elsewhere in or on SSFTD 300, such as on a rear housing of SSFTD 300 that may be accessible to maintenance servicers of SSFTD 300 but not necessarily to the general public. Regardless of the location of the port, data read from removable computer-readable medium 311 by removable media interface 309 may be provided to computer 301, and data provided by computer 301 may be written by removable media interface 309 to computer-readable medium 311.

Scanner 313 may include, for instance, a camera that is able to take a digital photograph of a check to produce one or more images representing the front and/or back of the check. In addition to generating an image of the check, scanner 313 may be further capable of reading magnetically printed information on the check, such as magnetic ink that is typically printed on a check, and performing magnetic ink character recognition (MICR). Such MICR processes are well known. The data produced by performing MICR that represents the recognized magnetic ink characters is referred to herein as MICR data. Scanner 313 further may be configured to perform optical character recognition (OCR) on a check, which involves the translation of optically scanned text or written information on the check into machine-encoded text that can be read by scanner 313.

In another aspect of the disclosure, a system (e.g., SSFTD 300 and surrounding area) may include hardware (e.g., sensors, timers, or audio/video recorders) and/or software components (e.g., computer-executable instructions stored on non-transitory, tangible computer-readable media) to assist in measuring and collecting various readings. The system may include a means for capturing a user's arrive time and queue time while waiting for a SSFTD. For example, a video camera may be installed in or in close proximity to the SSFTD (e.g., physically outside of the SSFTD) to allow capture of information such as the time when a user first gets in line to use a SSFTD and/or the total amount of time the user waits before a SSFTD is available for his/her use. In another example, enhanced optical sensors in combination with an invisible scattered laser beam may be used to detect the presence of users in an area around the SSFTD and track their movement to determine user wait time data. In yet another example, pressure sensors (e.g., in a floor mat upon which users in a queue might stand, or in an object over which a vehicle may drive in a drive-up SSFTD) may be used to capture a user's arrive time and queue time. In yet another example, video cameras installed at a retail location may be used to obtain additional user insights and wait time tolerances. In addition, the means for capturing may include a processor, memory, and/or computer-executable instructions to assist in analyzing the captured data to actually calculate user wait time data.

In addition, the SSFTD 300 may collect transaction data and user wait time data resulting from a user's interaction at a SSFTD site. Examples of transaction data include, but are not limited to, one or more of: transaction time (i.e., the time when the transaction started and/or ended), transaction date (i.e., the date of the transaction and/or day of the week), transaction type (e.g., deposit, withdrawal, balance inquiry, or any other transaction type), unique card identifier (i.e., any means to uniquely identify the user), and unique terminal identifier. In some examples, the unique terminal identifier may comprise information about whether the SSFTD is located inside or outside, whether it is located on the premises of a financial institution, approach type (e.g., whether it is drive-up or walk-up SSFTD), and configuration information (e.g., whether the location has a single-SSFTD or dual-SSFTD configuration, a single user queue with a dual-SSFTD configuration, or separate queues with a dual-SSFTD configuration.) In some examples, a mapping file (e.g., a text or binary file) may identify each particular configuration that corresponds to each unique terminal identifier. The SSFTD 300 or a remote computer 101 may store/maintain the mapping file and compare each unique terminal identifier to the mapping file to determine the configuration. In an alternate embodiment, the unique terminal identifier may be coded such that a portion of the digits may indicate the type of configuration. For example, the last 3 digits of the unique terminal identifier may be set to "001" if the configuration is a single walk-up SSFTD, and "010" if the configuration is a single drive-up SSFTD, and so on.

Figure 6:
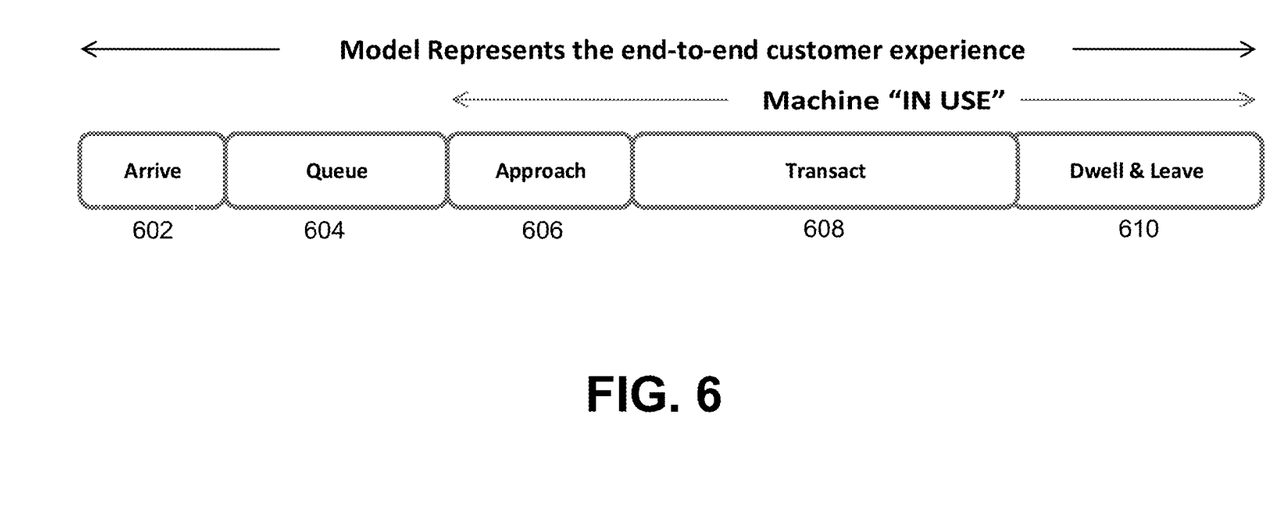
FIG. 6 illustrates the end-to-end user experience for a SSFTD, including user wait time and other times outside of actual machine utilization.

Referring to FIG. 6, the user wait time data may include arrive time 602, queue time 604 and/or dwell/leave time 610. The arrive time 602 may be the time and date when a user gets into a queue to use a SSFTD, and the queue time 604 may be the total time that the user waits in the queue before the time he/she approaches 606 the SSFTD to begin one or more transactions 608. While the system may collect data on a per transaction basis during time 608, the system may later (or in near real-time) combine the numerous transaction data to form session data. The session data for a user may be later formed by identifying consecutive transactions (e.g., using the timestamp of each transaction) at the SSFTD with the same banking card (or other unique user identifier). The session data (e.g., session time) more accurately represents the economies of scale that occurs when a user performs multiple transaction during a visit to a SSFTD.

Finally, the dwell/leave time 610 may be the amount of time after transactions are completed that a user occupies the SSFTD 300. In the example of a drive-up SSFTD, a user may linger after the transaction (e.g., on the cell phone and/or searching/organizing belonging in front of the SSFTD before driving away), thus resulting in a longer period of time that the machine is "in use" and unavailable to the next user. In the example of a walk-up SSFTD, a user may count and re-count dispensed cash after completing a transaction or may be organizing their belonging into a purse after a transaction, before stepping away from the SSFTD. The enhanced modeling and business rules/metrics of the disclosure factor in the total end to end user experience, including wasted dwell/leave time and queue time. A SSFTD capacity model based solely on utilization fails to properly account for a poor drive-up SSFTD user experience. In the pure utilization model, single drive-up SSFTDs will infrequently meet high utilization thresholds because that model fails to account for the sometimes noticeable user dwell time, which may result in time when a drive-up SSFTD is unavailable for use, but for practical purposes, still in use, as illustrated in FIG. 6. As such, the enhanced model of this disclosure identifies updated thresholds for drive-up SSFTDs that account for the user dwell time and result in an improved end to end user experience (e.g., greater likelihood that user wait time will be less for a great majority of users.) Based on empirical data collected and analyzed, in some embodiments, the user dwell time allows for a more accurate model of a single drive-up SSFTD because that configuration rarely shows SSFTD utilization over 75%, yet customer wait times, thus the end-to-end user experience, may be poor.

While the SSFTD 300 has been described in some embodiments as comprising particular components and/or memory storing particular computer-executable instructions, the disclosure contemplates one or more components and/or memories being located outside of the SSFTD 300. For example, transaction data may be aggregated, sorted, and used to determine session data at a remote computing system 101. In another embodiment, some SSFTDs might not include a means for capturing (e.g., a video camera) a user's arrive time and queue time. Rather, these SSFTDs may simply provide transaction data and/or session data to the remote computing system 101. The system may compensate for the lack of data with respect to the particular SSFTD using heuristics and statistical techniques, including simulation models and Monte Carlo techniques, based on historical and current data collected from comparable SSFTD configurations (and other sources).

Figure 8:
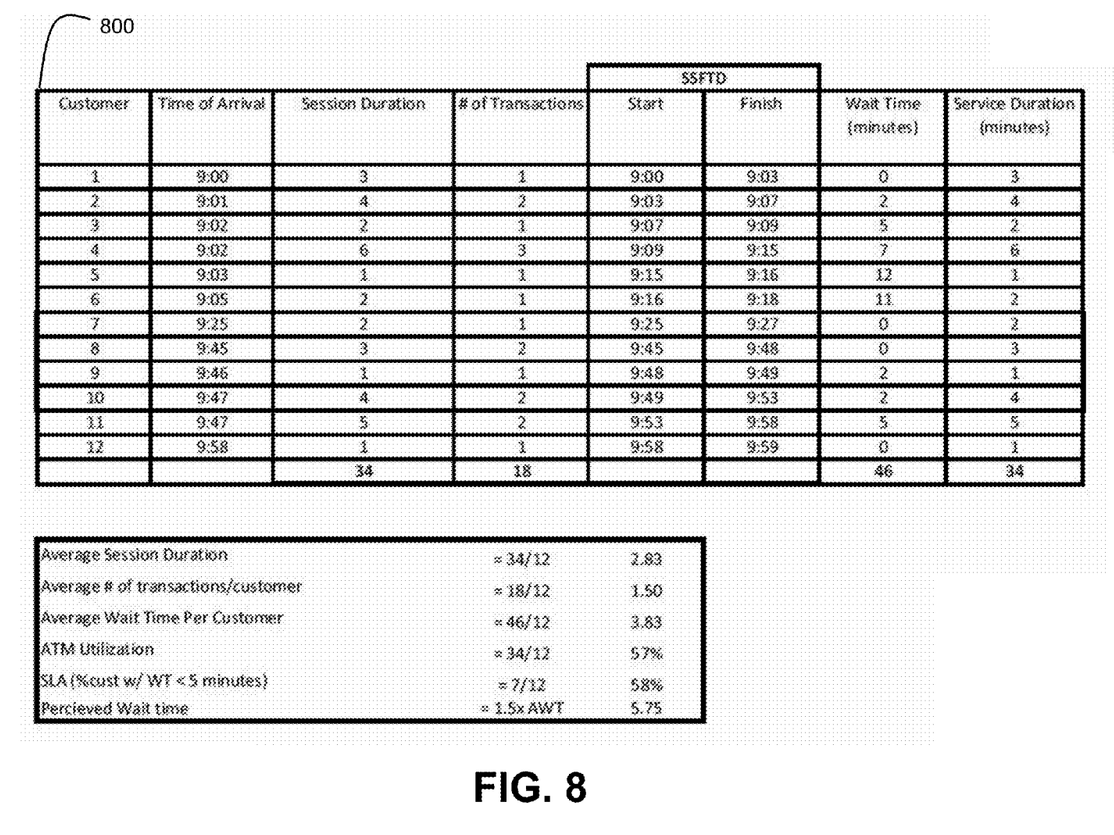

Referring to FIG. 8, aspects of the disclosure relate to methods and systems 101 for using an enhanced model to simulate numerous scenarios for each SSFTD configuration each hour and derive key outputs to model the complete end-to-end user experience. As a result, the system determines when installation of additional SSFTDs (e.g., computing devices 141, 151) may be desired at a location/site, and generates recommendations accordingly. The system may include a processor 103 and memory 115 (e.g., database, data store, or other means for memory) to store transaction-level data and other data about SSFTDs and an enhanced SSFTD user wait time model to identify appropriate recommendations and other outputs. In some embodiments, the system may group the transaction data, session data, and/or user wait time data by SSFTD configuration to formulate a data set for use with an enhanced model for simulations with the particular SSFTD configuration.

As shown in the table 800 of sample data, twelve users interacted with a SSFTD during a one-hour interval. The data from each user's session shows the various wait times for each user. The data from the table 800 is used to generate an output (displayed at the bottom of FIG. 8) that shows the average wait time per user and other statistics for the hour. These outputs may comprise the data set on which appropriate business rules and metrics, such as user wait time service level agreement or utilization, may be applied. Some example of these outputs may include, but are not limited to queue lengths, user wait time, SSFTD utilization, transactions completed by type, average transaction duration by type, and others. Other examples of outputs include, but are not limited to average wait time over a predetermined time period, percentage of users with wait time below a predetermined threshold, SSFTD utilization over a predetermined time period, and number of hours where SSFTD utilization is over a predetermined threshold.

Specifically, disclosed herein is an enhanced modeling of SSFTD utilization that incorporates user behavior (e.g., the full end to end user experience) to simulate user wait time. The enhanced model identifies capacity constrained SSFTD sites where the user experience is poor. While prior SSFTD modeling attempts simply identified most highly utilized SSFTDs, those did not always capture the SSFTD sites where user experience was poor. Through the enhanced model a specific correlation between user wait time and SSFTD utilization is identified. A long user wait time correlates with high SSFTD utilization. Additionally, the enhanced model accounts for outliers with high peak time traffic patterns and low monthly volume.

Figure 7:
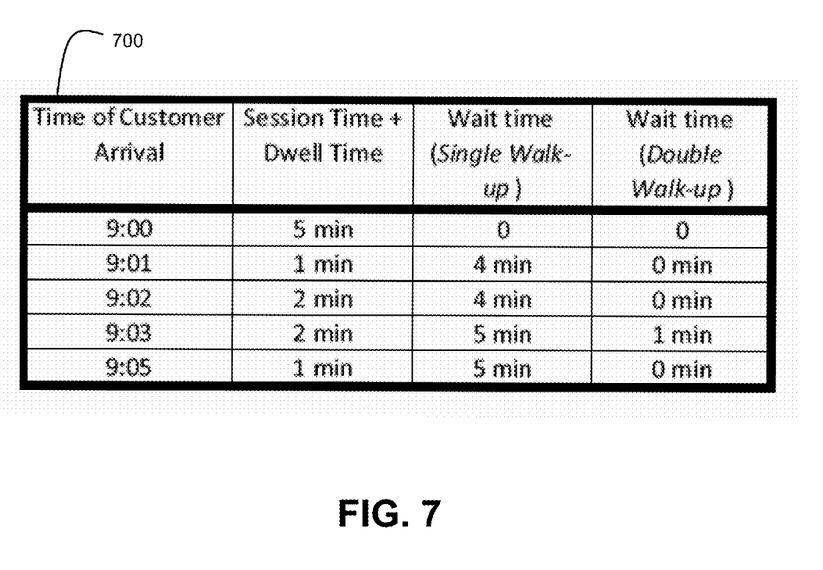
FIGS. 7 and 8 illustrate sample data points for a SSFTD configuration, where user wait time and other transaction data is collected for analysis in accordance with aspects of the disclosure.

Referring to FIG. 7, the configuration of the SSFTD location and the way the customer line forms are at least two factors driving the difference in user wait time. For example in table 700, a dual walk-up SSFTD substantially reduces wait time as compared to a single walk-up SSFTD. Data such as that displayed in tables 700 and 800 may be collected and saved in a data store at a remote computing system for analysis and use in an enhanced model simulating the SSFTD configuration. Such enhanced model allow identification of the discovery that two side-by-side SSFTDs with one customer line serve more customers faster than two SSFTDs in different locations with separate lines. Moreover, different types (e.g., drive-up versus walk-up) of SSFTDs require different machine utilization characteristics to maintain good end-to-end user experience. Other discoveries of business rules for the configuration and placement of SSFTD include those described below.

Figure 5A:
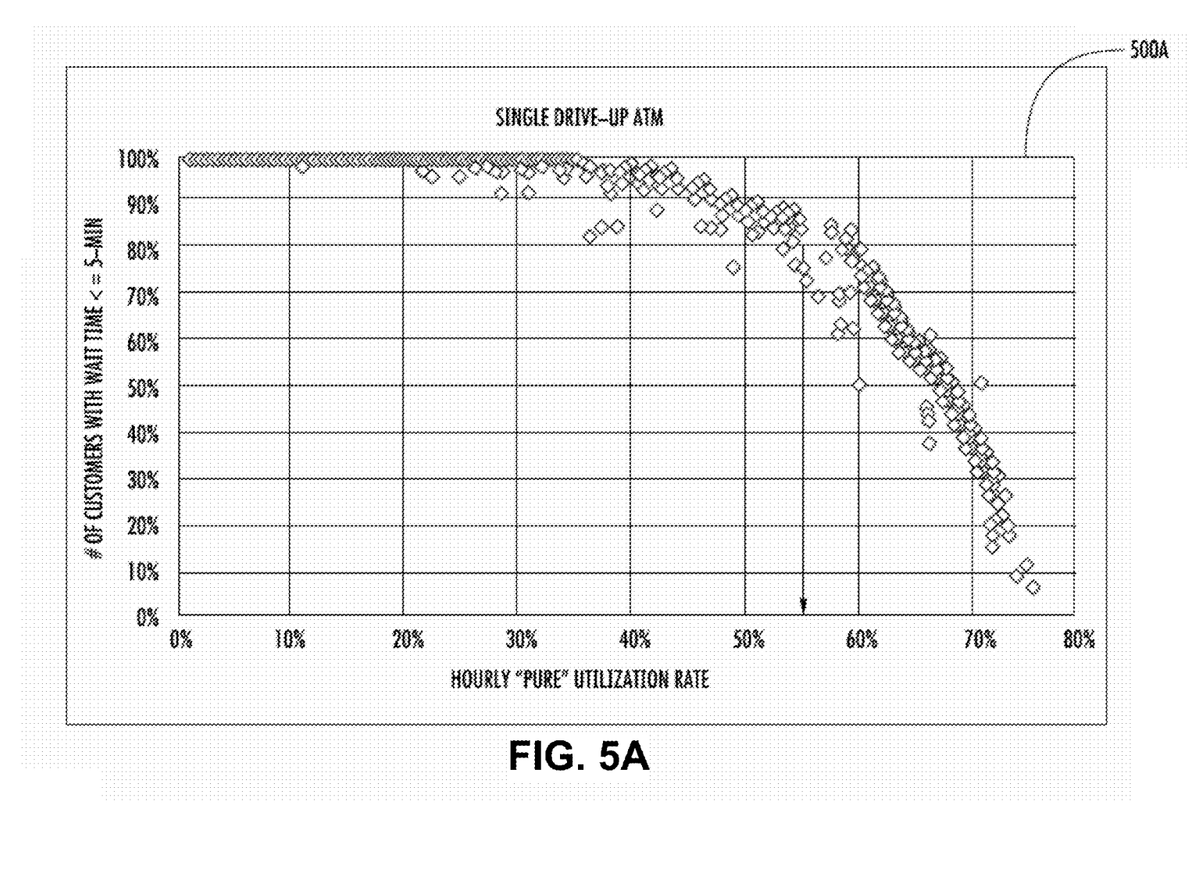
FIGS. 5A and 5B illustrate collected data from a single drive-up SSFTD configuration.
Figure 5B:
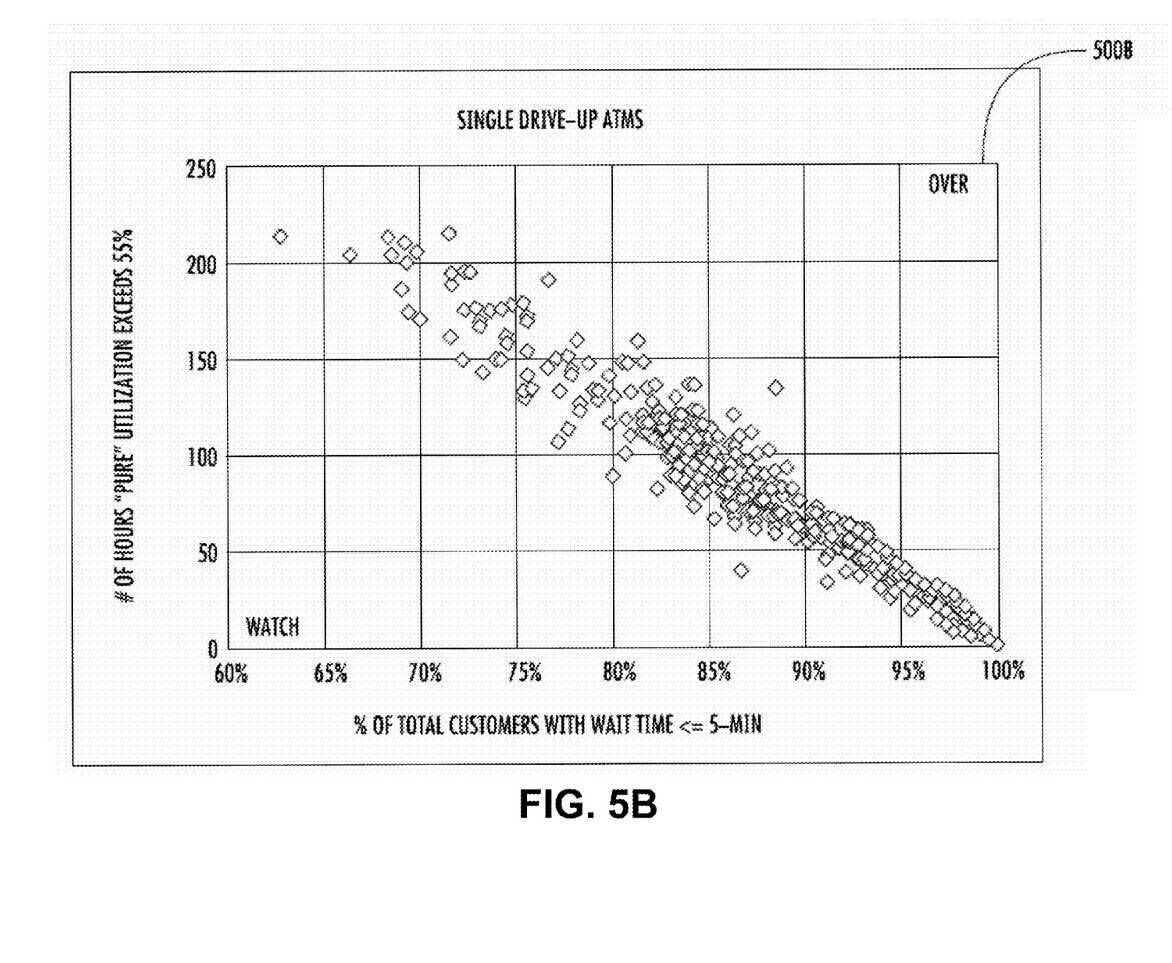

For example, referring to FIGS. 5A and 5B, sample data from one or more single drive-up ATMs (e.g., SSFTDs) is displayed. FIG. 5A shows the hourly utilization rate of the SSFTD as compared to the percentage of users that wait five minutes or less to use the single drive-up SSFTD. With a desired predetermined threshold of 80% for percentage of users with wait times of five minutes or less, the data points from FIG. 5A indicate that a hourly SSFTD utilization rate of approximately 55% is desirable. Furthermore, referring to FIG. 5B, the 80% threshold corresponds to approximately 140 hours where SSFTD utilization exceeded 55%. As such, the enhanced model provides for the creation and implementation of a business rule that if at a single drive-up SSFTD, the SSTFD machine utilization exceeds 55% for more than 140 hours in a month, then the system, based on the enhanced model, may recommend adjusting the configuration of the SSFTD to replace the single drive-up with a dual drive-up configuration. The enhanced model allows for the recommendation to be based on machine utilization statistics, however, the end-to-end user experience is considered in the recommendation (e.g., 80% of users will experience 0-5 minutes of wait time). One skilled in the art will appreciate that the sample data of FIG. 5A and FIG. 5B may be used to set different user wait thresholds such that even less percentage of users will experience wait times greater than 5 minutes.

In other examples, sample data may be collected for other SSFTD configurations such that outputs and recommendations may be provided accordingly. For example, if hourly SSFTD utilization is above 60% but the number of hours the utilization threshold of 60% is exceeded is less than 110 hours in a month, then the system, based on the enhanced model, may recommend that only one walk-up SSFTD is necessary to maintain a successful end-to-end user experience. In another example, if the hourly SSFTD utilization is above 70% and the number of hours the utilization threshold of 70% is exceeded is over 120 hours, then the system may recommend a 2+ walk-up SSFTD. In yet another example, for a single drive-up SSFTD, if hourly SSFTD utilization is above 55% but the number of hours the utilization threshold of 55% is exceeded is less than 140 hours in a month, then the system, based on the enhanced model, may recommend that only one drive-up SSFTD is necessary to maintain a successful end-to-end user experience. In yet another example, if hourly SSFTD utilization is above 65% and the number of hours the utilization threshold of 65% is exceeded is greater than 110 hours in a month, then the system, based on the enhanced model, may recommend that a 2+ drive-up SSFTD may be desirable to maintain a successful end-to-end user experience.

While the examples above provide numerous parameters for the collection, analysis, and/or recommendation of adjustments to the configuration/type of SSFTDs, this disclosure also contemplates other combinations and parameters. For example, the enhance model may, in some embodiments, calculate utilization values for time intervals other than one hour. For example, utilization data may be calculated and rated based on 30-minute intervals, two-hour intervals, or other intervals.

Referring to FIG. 5B, other aspects of the disclosure may assist in the earlier identification of a problematic SSFTD site through analysis of collected measurements as compared to statistical measurements in the enhanced model. For example, the data points in the "watch" rectangular area in the lower-left of the graph may indicate a malfunctioning SSFTD because although machine utilization may be at the desired 55% threshold, if the percentage of users waiting longer than 5 minutes is high, then this may be an indication that something is causing unnecessary delays between uses. The system may send a recommendation to personnel responsible for the maintenance of the SSFTD that a problem may be occurring at the SSFTD site.

Figure 4:
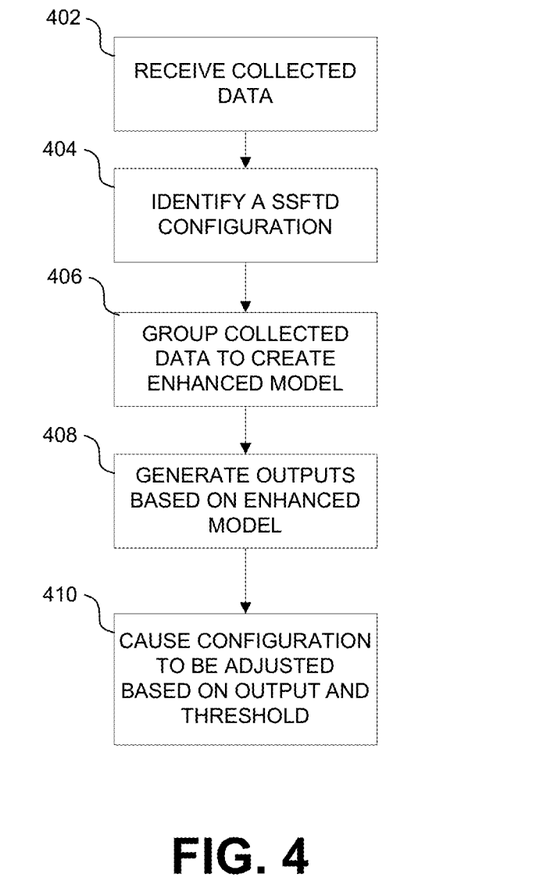
FIG. 4 is a flowchart illustrating an example method performed by a remote computer according to one or more aspects of the present disclosure.

FIG. 4 illustrates an example method performed by a remote computing system 101 in communication with a SSFTD 300 in accordance with aspects of the disclosure. The system 101 may receive (in step 402), from a SSFTD 300, collected data, where the collected data comprising one or more of transaction data, session data, and user wait time data. In step 404, the computer system 101 may identify the SSFTD configuration using the unique terminal identifier from the collected data. In step 406, the computer system 101 may create an enhanced user wait time model by grouping some or all of the collected data corresponding to an identified configuration. The grouped data may be used to determine a relationship between hourly user wait time data and hourly device utilization, as depicted in FIG. 5A. Moreover, the grouped data may be used to determine a relationship between monthly user wait time data and monthly device utilization, as depicted in FIG. 5B. In step 408, the computer system 101 may generate outputs, including recommendations, based on the enhanced user wait time model. The recommendations may be based on predetermined thresholds (e.g., device utilization thresholds or user wait time thresholds) and the enhanced user wait time model. The predetermined thresholds may be set based on a desired goal for user wait time (e.g., a goal of 80% of users experiencing less than 5 minutes of wait time). In step 410, the computer system 101 may cause (e.g., through a recommendation message sent to an administrator or capacity planning department or displayed on a graphical user interface for display) a configuration of an SSFTD to be adjusted based on the generated outputs and the predetermined thresholds. The adjustments to the configuration of SSFTDs may include, but are not limited to replacing a single walk-up with a dual walk-up, replacing a dual walk-up with a single walk-up, replacing a single drive-up with a dual drive-up, replacing a dual drive-up with a single drive-up, and/or consolidating two single walk-ups at two sites into a single dual walk-up. After review of the entirety disclosed herein, one skilled in the art will appreciate that the predetermined thresholds may be tweaked as desired to obtain business objectives of less user wait time or greater device utilization.

Although specific examples of carrying out the aspects of the disclosure have been described, those skilled in the art will appreciate that there are numerous variations and permutations of the above-described systems and methods that are contained within the spirit and scope of the disclosure as set forth in the appended claims. Additionally, numerous other embodiments, modifications and variations within the scope and spirit of the appended claims will occur to persons of ordinary skill in the art from a review of this disclosure.

We claim:

1. A system comprising:
    a self-service financial transaction device configured to at least one of: receive a check for deposit in a user's account, dispense currency from the user's account, and provide total balance of the user's account;
    at least one processor; and
    at least one memory having stored therein computer-executable instructions, that when executed by the at least one processor, cause the system to perform a method of:
        collecting transaction data resulting from the user's interaction with the self-service financial transaction device, wherein the transaction data includes transaction time, transaction date, transaction type, unique card identifier, and unique terminal identifier;
        collecting user wait time data, the wait time data corresponding to at least a duration that the user waits before using the self-service financial transaction device; and
        combining transaction data to form session data based on consecutive transactions at the self-service financial transaction device with the same unique card identifier; and
    a communications network transmitter configured to transmit the collected transaction data, the session data, and the user wait time data to a remote computer, wherein the remote computer comprises an enhanced model determined using the transaction data, session data, and user wait time data.

2. The system of claim 1, comprising:
    the remote computer configured to generate outputs based on the enhanced model, wherein the outputs comprise at least one of: average wait time over a predetermined time period, percentage of users with wait time below a predetermined threshold, self-service financial transaction device utilization over a predetermined time period, and number of hours where self-service financial transaction device utilization is over a predetermined threshold, and wherein the enhanced model groups the transaction data, session data, and user wait time data by self-service financial transaction device configuration.

3. The system of claim 2, wherein the remote computer causes configuration of the self-service financial transaction device to be adjusted based on the generated outputs and predetermined user wait thresholds.

4. The system of claim 1, comprising:
    a means for capturing a user's arrive time and queue time.

5. The system of claim 4, wherein the means for capturing comprises at least a video camera, the at least one processor, and the at least one memory having stored therein computer-executable instructions.

6. The system of claim 1, wherein the unique terminal identifier comprises information about whether the self-service financial transaction device is located inside or outside, whether it is located on the premises of a financial institution, approach type, and configuration.

7. The system of claim 1, wherein the communications network transmitter includes a wireless transmitter configured to transmit the collected transaction data and the session data over a wireless network.

8. The system of claim 1, wherein the self-service financial transaction device is an automated teller machine.

9. A method comprising:
    receiving, from a self-service financial transaction device, collected data, the collected data comprising transaction data, session data, and user wait time data, and wherein the transaction data comprises transaction time, transaction date, transaction type, unique card identifier, and unique terminal identifier, and wherein the user wait time data comprises a user's arrive time and queue time;
    identifying, by a computer, a self-service financial transaction device configuration using the unique terminal identifier, wherein the configuration comprises at least one of: single walk-up, dual walk-up with single user queue, dual walk-up with dual user queue, single drive-up, dual drive-up with single user queue, and dual drive-up with dual user queue;
    grouping, by the computer, the collected data corresponding to an identified configuration to create an enhanced user wait time model;
    generating, by the computer, outputs based on the enhanced user wait time model, where the outputs comprise at least one of: average wait time over a predetermined time period, percentage of users with wait time below a predetermined threshold, self-service financial transaction device utilization over a predetermined time period, and number of hours where self-service financial transaction device utilization is over a predetermined threshold; and
    causing configuration of the self-service financial transaction device to be adjusted based on the generated outputs and predetermined user wait thresholds.

10. The method of claim 9, wherein the adjustment to the configuration of the self-service financial transaction device includes at least one of: replacing a single walk-up with a dual walk-up, replacing a dual walk-up with a single walk-up, replacing a single drive-up with a dual drive-up, replacing a dual drive-up with a single drive-up, and consolidating two single walk-ups at two sites into a single dual walk-up.

11. The method of claim 9, wherein the identifying the configuration using the unique terminal identifier comprises comparing the unique terminal identifier against a mapping file to determine its configuration.

12. The method of claim 9, further comprising:
    determining a relationship between hourly user wait time data and hourly device utilization;
    determining a relationship between monthly user wait time data and monthly device utilization; and
    setting the predetermined user wait thresholds based on a desired goal for user wait time.

13. The method of claim 9, wherein the configuration of the self-service financial transaction device is adjusted from a single walk-up to a dual walk-up when the hourly device utilization is greater than a first specified threshold, the first specified threshold configured to keep user wait time within a first specified range.

14. The method of claim 9, wherein the configuration of the self-service financial transaction device is adjusted from a single drive-up to a dual drive-up when the hourly device utilization is greater than a second specified threshold to keep user wait time within a second specified range.

15. The method of claim 9, wherein the self-service financial transaction device is an automated teller machine.

16. One or more non-transitory computer-readable media storing computer-readable instructions that, when executed by at least one computer, cause the at least one computer to perform a method of:
    identifying a configuration of one or more self-service financial transaction devices using a unique terminal identifier, wherein the configuration comprises at least one of: single walk-up, dual walk-up with single user queue, dual walk-up with dual user queue, single drive-up, dual drive-up with single user queue, and dual drive-up with dual user queue;
    grouping collected data corresponding to an identified configuration to create an enhanced user wait time model, the collected data comprising transaction data, session data, and user wait time data, and wherein the transaction data comprises transaction time, transaction date, transaction type, unique card identifier, and unique terminal identifier, and wherein the user wait time data comprises a user's arrive time and queue time; and
    generating a recommendation for adjusting the configuration of the one or more self-service financial transaction devices based on the enhanced user wait time model.

17. The one or more non-transitory computer-readable media of claim 16, the computer-readable instructions that, when executed by at least one computer, further cause the at least one computer to perform:
    Determining a relationship between hourly user wait time data and hourly device utilization;
    determining a relationship between monthly user wait time data and monthly device utilization; and
    setting the predetermined user wait thresholds based on a desired goal for user wait time.

18. The one or more non-transitory computer-readable media of claim 16, wherein the outputs comprise at least one of: average wait time over a predetermined time period, percentage of users with wait time below a predetermined threshold, self-service financial transaction device utilization over a predetermined time period, and number of hours where self-service financial transaction device utilization is over a predetermined threshold.

19. The one or more non-transitory computer-readable media of claim 16, wherein the recommendation for adjusting the configuration of the one or more self-service financial transaction devices includes at least one of: replacing a single walk-up with a dual walk-up, replacing a dual walk-up with a single walk-up, replacing a single drive-up with a dual drive-up, and replacing a dual drive-up with a single drive-up.

20. The one or more non-transitory computer-readable media of claim 16, wherein the recommendation for adjusting the configuration of the one or more self-service financial transaction devices is to replace a single walk-up to a dual walk-up when the hourly device utilization of the single walk-up is greater than a specified value during a specified duration.

* * * * *